Patented Sept. 12, 1933

1,926,874

UNITED STATES PATENT OFFICE 1,926,874

SUBSTITUTED POLYALKYL-HYDROXY-DIPHENYLMETHANE

Emil Klarmann, Jersey City, and Louis William Gates, Bloomfield, N. J., assignors to Lehn & Fink, Inc., Bloomfield, N. J., a corporation of Delaware No Drawing. Application March 29, 1932
Serial No. 601,885

8 Claims. (Cl. 260—64)

The present invention relates to halogen substituted polyalkyl-hydroxy-diphenylmethane compounds, which components we have found to be highly effective as bactericidal agents. In the compounds in accordance with the present invention, the halogen, which may be chlorine, bromine, iodine or the like, may be substituted in either nucleus of the compound. In general, compounds of this character may be prepared by the condensation of a polyalkyl-phenol with benzyl chloride or a homologue thereof, one of the reacting constituents being halogen substituted in its nucleus, such condensation being effected suitably in the presence of a condensing agent, such as zinc chloride or other heavy metal chloride, sulfuric acid or the like; or by the direct reaction of an alkali metal compound of a polyalkyl-phenol with benzyl chloride or a homologue thereof, one of the reacting materials having a halogen substituted in its ring. The resulting compounds have high bactericidal efficiency, with a markedly high effectiveness in many cases toward specific bacteria, as will be hereinafter pointed out.

The following specific example illustrates the production of a compound in accordance with the present invention.

4-chloro-symmetrical meta-xylenol is converted into a corresponding alkali metal compound, for example, the sodium compound by reacting thereon, for example, with sodium in toluene in approximately equimolecular proportions, say 52.3 parts of the former and 7.7 parts of the latter. Benzyl chloride in approximately equimolecular proportions (say 42.3 parts to the above reaction mixture) is then added slowly with stirring and the mixture is heated and stirring continued for about 4 hours at a moderately high temperature, say 120–125° C. The residual reaction mixture is then suitably purified; for example, it may be washed with water and benzol, and the phenolic bodies then extracted with an alcoholic alkali solution, for example, a solution of sodium hydroxide in aqueous methyl alcohol. The resulting solution is acidified, the desired compound being thereby precipitated and after separation, it is subjected to vacuum distillation. The desired product is the fraction distilling between 182 and 185° C. at 4 mm. Hg. pressure and after separation, it may be crystallized from a suitable solvent mixture, say a mixture of carbon tetrachloride and petroleum ether. The compounds is 5-chloro-4, 6-dimethyl-2-hydroxy diphenylmethane. It has a melting point of 68.7° C. and its phenol coefficient with respect to B. typhosus is 30 and with respect to Staph. aureus is 920.

The same compound may be produced by condensing the sodium compound of symmetrical meta-xylenol with benzyl chloride in substantially the manner above described, separating and subsequently chlorinating the resulting product. It may also be obtained by condensation of 4-chloro-symmetrical meta-xylenol with benzyl chloride in the presence of heavy metals e. g. sinc, its chloride or chlorides of other heavy metals, sulfuric acid, etc.

By using polyalkyl-phenols substituted with other halogens, such as the bromo or iodo-xylenols the corresponding halogen substitution products may be made. Similarly, by employing other polyalkyl phenols, such as diethyl-phenol, dipropyl-phenol, thymol, carvacrol, or the like, or the halogen derivatives thereof, instead of xylenol or its halogen derivatives, the halogen derivatives of such other polyalkyl-hydroxy-diphenylmethanes may be prepared.

For example, by condensing the sodium compound of chloro-thymol with benzyl chloride we have prepared 5-chloro-6-methyl-3-isopropyl-2-hydroxy-diphenylmethane, which is an effective bactericidal. It is an oil liquid which distills at 180° C. at 3 mm. Hg. absolute.

The halogen may likewise be substituted in the other ring of the diphenyl methane compound, in which the polyalkyl and hydroxyl groups are not substituted. For example, by condensing para-chloro-benzyl chloride with the sodium compound of symmetrical xylenol in substantially the manner above described, 4'-chloro-4, 6-dimethyl-2-hydroxy-diphenylmethane may be prepared; and by using benzyl chloride substituted with other halogens, for example, para-bromo-benzyl chloride, the substitution of other halogens in the ring may be secured. Thus, the compound 4'-bromo-4, 6-dimethyl-2-hydroxy-diphenylmethane may be prepared. It distills at 195° C. at 4 mm. Hg. and melts at 102° C. Its phenol coefficient with respect to Staph. Aureus is 420. By using, in place of xylenol, other polyalkyl phenols, such as diethyl-phenol, dipropyl-phenol, thymol, carvacrol, or the like, corresponding compounds of other dialkyl hydroxy diphenylmethanes may be prepared; and by employing halogen substituted benzyl chlorides with the substituting halogen in the meta or para positions, a corresponding change in position of the halogen in the final compound may be secured.

We claim:
1. As a composition of matter, a halogen substituted polyalkyl-hydroxy-diphenylmethane.
2. As a composition of matter, a halogen substituted dialkyl-hydroxy-diphenylmethane.
3. As a composition of matter, a chloro-polyalkyl-hydroxy-diphenylmethane.
4. As a composition of matter, a chloro-dialkyl-hydroxy-diphenylmethane.
5. As a composition of matter, chloro-dimethyl-hydroxy-diphenylmethane.
6. As a composition of matter, 5-chloro-4-6-dimethyl-2-hydroxy-diphenylmethane.
7. As a composition of matter, a 4'-halogen substituted-4-6-dimethyl-2-hydroxy-diphenylmethane.
8. As a composition of matter, 4'-bromo-4,6-dimethyl-2-hydroxy-diphenylmethane.

EMIL KLARMANN.
LOUIS WILLIAM GATES.